United States Patent [19]

Heinert

[11] 3,846,508

[45] Nov. 5, 1974

[54] FIRE RETARDANT POLYURETHANES CONTAINING TRICHLOROETHYLENE/ VINYL ACETATE COPOLYMER

[75] Inventor: Dietrich H. Heinert, Midland, Mich.

[73] Assignee: The Dow Chemical Company, Midland, Mich.

[22] Filed: Aug. 1, 1973

[21] Appl. No.: 384,661

[52] U.S. Cl.... 260/859 R, 260/2.5 AJ, 260/2.5 AK, 260/2.5 BE, 260/23 TN, 260/859 PV
[51] Int. Cl............................................. C08g 41/04
[58] Field of Search...... 260/859 R, 859 PV, 2.5 BE

[56] References Cited
UNITED STATES PATENTS

| | | | |
|---|---|---|---|
| 3,025,268 | 3/1962 | Deex | 260/859 R |
| 3,305,503 | 2/1967 | Russell | 260/859 R |
| 3,562,355 | 2/1971 | Holden | 260/859 R |
| 3,616,191 | 10/1971 | Fuerholzer | 260/859 R |
| 3,632,789 | 1/1972 | Wilhelm | 260/859 R |
| 3,644,233 | 2/1972 | Traubel | 260/859 R |
| 3,772,220 | 11/1973 | Parker | 260/2.5 BE |

OTHER PUBLICATIONS

Turner Alfrey et al., Experimental Study of Copolymerization III, Journal of Polymer Science, Vol. 3, No. 2, (1948), pp. 297–301.

Primary Examiner—Paul Lieberman
Attorney, Agent, or Firm—Richard G. Waterman; Michael S. Jenkins

[57] ABSTRACT

Markedly improved flame retardance is imparted to polyurethanes by incorporating therein a trichloroethylene/vinyl acetate copolymer. The resulting flame retardant compositions are particularly useful as instant set or elastomeric urethanes and in the fabrication of foamed polyurethanes.

3 Claims, No Drawings

FIRE RETARDANT POLYURETHANES CONTAINING TRICHLOROETHYLENE/VINYL ACETATE COPOLYMER

BACKGROUND OF THE INVENTION

This invention relates to fire retardant or self-extinguishing polyurethane compositions containing halogenated organic moiety as flame retardant additive.

Elastomeric polyurethanes and non-foamed solid elastoplastic polyurethanes are finding increased application as engineering plastics in structural applications. As a group, such polyurethanes are often referred to as "instant set" or "reaction molding" polyurethanes which vary in physical characteristics from soft elastic material to those which are rigid and hard.

The use of polyurethane in the manufacture of foamed articles is also well known, particularly in the fabrication of insulation and cushioning or padding for a wide variety of applications. Unfortunately, the polyurethane foams are very combustible thereby creating a significant fire hazard for articles employing them.

Also polyurethane coatings are becoming widely utilized in the coating of wood, synthetic plastics and other materials to provide such substrates with tough abrasive resistant coatings. Unfortunately, these coatings, like the conventional varnish coatings, contribute significantly to the flammability of the product and to the rapid spread of fire resulting therefrom.

The methods of the prior art have obtained fire resistance in urethane compositions by the use of various substances, such as the various phosphate or phosponate esters or chlorinated organic compounds. However, such substances are often toxic and also deleteriously affect the physical properties of the polyurethane plastic and in many cases such substances are progressively lost from the plastic by evaporation, leaching and the like.

In view of the difficulties experienced in rendering polyurethanes fire retardant by conventional means, it would be highly desirable to provide a fire retardant polyurethane having physical properties comparable to polyurethane containing no additive.

SUMMARY OF THE INVENTION

In accordance with the present invention, polyurethane compositions having the aforementioned properties can be prepared by incorporating into polyurethane a trichloroethylene/vinyl acetate copolymer having a trichloroethylene moiety of at least 33.3 mole percent.

As an additional advantage in the practice of the present invention, the aforementioned copolymer additive can be incorporated into an organic polyisocyanate or an organic compound with reactive hydrogens such as polyol which is subsequently reacted with the other to form the desired polyurethane. Surprisingly it is found that the presence of the copolymer additive in substantial quantities does not significantly impair the physical properties of the resultant polyurethane. Also, it is found that such copolymers act effectively to absorb the heat of polymerization in the formation of the polyurethane and thereby prevent the foaming which often is caused by the decomposition of certain materials present such as the polyisocyanate.

As a result of their improved flame retardance and good physical properties, polyurethane compositions of the present invention are particularly useful in solid (non-foamed) structural applications such as panels, housings and decorative articles and mechanical parts. Such compositions are also useful as coatings for a wide variety of substrates as well as in foamed applications such as insulation for construction and as padding and cushioning in many furniture applications.

For the purposes of this invention the term polyurethane shall mean a normally solid, polymeric reaction product of a polyisocyanate and an organic compound with reactive hydrogen atoms, such as those existing in alcohols including polyols and amines.

Such polyurethanes are further characterized as materials which normally burn for a measurable period of time when exposed to flame in air, e.g., do not self-extinguish within one second upon removal of flame therefrom.

DESCRIPTION OF PREFERRED EMBODIMENTS

The trichloroethylene/vinyl acetate copolymers employed in the present invention contain from about 33.3 to about 66.7 mole percent of trichloroethylene with the balance of the copolymer being from about 33.3 to about 66.7 mole percent of vinyl acetate exclusive of any initiator. Such copolymers suitably have a molecular weight in the range from about 300 up to about 20,000. Preferred copolymers contain from about 50 to about 66.7 mole percent of trichloroethylene, especially from about 57 to 66.7 mole percent of trichloroethylene, and from about 33.3 to about 50 mole percent of vinyl acetate, especially from about 33.3 to about 43 mole percent of vinyl acetate, and have a molecular weight in the range from about 300 to about 6000, especially from about 300 to about 2500. It is further understood that a portion or all of the vinyl acetate moiety of the copolymer may be hydrolyzed to vinyl alcohol moiety. Further, the hydroxyl group of the resultant copolymerized vinyl alcohol can be reacted with various materials, such as maleic anhydride to give a maleic half ester, or with other carboxylic acids or carboxylic acid chlorides to give esters of the various types. Such other carboxylic acids include unsaturated carboxylic acids such as acrylic and methacrylic acid and saturated acids such as propanoic and butanoic acid, hydroxy acids such as lactic and hydracrylic acid and amino acids such as 3-aminopropanoic acid and 6-aminohexanoic acid.

Preferred copolymers contain alternating units of trichloroethylene and vinyl acetate in the copolymer backbone. Further it is found that such preferred copolymers contain large portions of molecules corresponding to the formula $[(TCE)_{n+1}(VOAC)_n]$ wherein TCE represents trichloroethylene and VOAC represents vinyl acetate. Analytical techniques for determining the molecular weight of such preferred copolymers shows the presence of distinct oligomers, i.e., copolymers with degrees of polymerization below 10, having molecular weights which correspond to the addition of monomer units in accordance with the above general formula beginning with the lowest member of $n = 1$. In actuality, the preferred copolymers of the present invention are mixtures of a major portion of the distinct oligomers described hereinbefore, and a minor portion of oligomers of the composition $[TCE \cdot VOAC]_n$, and a still smaller portion of oligomers of the composition $[(TCE)_n(VOAC)_{n+1}]$.

These preferred copolymers may be prepared by subjecting a monomeric mixture consisting essentially of trichloroethylene and vinyl acetate to free radical polymerization conditions. Preferably, the free radical polymerization conditions comprise copolymerization of the monomeric mixtures of from about 66 to about 99 mole percent of trichloroethylene and from about 1 to about 34 mole percent of vinyl acetate in the presence of free radical catalyst in concentrations from about 0.5 to about 2.5 weight percent based on monomeric mixture using reaction temperatures in the range from about 70° to about 120°C. Exemplary free radical catalysts used in the practice of this invention include azo compounds such as azobisisobutyronitrile and organic peroxygen compounds such as lauryl peroxide, benzoyl peroxide, acetyl peroxide, dicumene peroxide, isopropyl percarbonate, t-butyl peroxypivalate and other low temperature activated peroxide compositions.

The trichloroethylene and vinyl acetate to be polymerized to form the preferred copolymer may be dissolved in any solvent conventionally used for free radical solution polymerization or it may dissolved in excess trichloroethylene comonomer. Preferably, the monomeric material being polymerized by this process, constitutes from 30 to 100 percent and most preferably from about 80 to 100 percent of the total weight of the monomeric solution.

Other trichloroethylene/vinyl acetate copolymers suitable for use in the present invention are disclosed by Alfrey et al in *The Journal of Polymer Science*, Vol. 3, No. 2, pp. 297–300 (1948). Such suitable trichloroethylene/vinyl acetate copolymers should contain at least 33.3 mole percent of trichloroethylene in order to be suitable for the purposes of this invention.

The polyurethanes employed herein are the reaction products of polyisocyanates and organic compounds having reactive hydrogen atoms.

Exemplary polyisocyanates are the diisocyanates such as ethylene diisocyanate, hexamethylenediisocyanate, 2,4-toluene diisocyanate, 2,6-toluene diisocyanate, dicyclohexylmethane-4,4'-diisocyanate, m-phenylenediisocyanate, 1,2-, 1,3- and 1,4-xylylene diisocyanates, p-phenylenediisocyanate, 1-alkylbenzene-2,4-diisocyanates, 3-(α-isocyanatoethyl)-phenyldiisocyanate, 1-alkylbenzene-2,6-diisocyanate, 2,6-diethylbenzene-, 1,4-diisocyanate, diphenylmethane-4,4'-diisocyanate, diphenyldimethylmethane-4,4'-diisocyanate and naphthylene-1,5-diisocyanate as well as triisocyanates, e.g., toluene-2,4,6-triisocyanate, polyisocyanates of higher functionality and mixtures thereof. Of the foregoing, 2,4-toluene diisocyanate, 2,6-toluene diisocyanate and mixtures thereof are most preferred.

Exemplary active hydrogen compounds include linear or branched polyesters or polyester amides which may also contain heteroatoms, double and triple bonds and modified radicals of saturated or unsaturated fatty acids or fatty alcohols, prepared from polyfunctional alcohols and polyfunctional carboxylic acids or oxycarboxylic acids, in some cases with the use of amino alcohols, diamines, hydroxyamines or aminocarboxylic acids, in some cases also with the use of monofunctional alcohols and carboxylic acids. Linear polyalkylene glycol ethers of various molecular weights obtained by polymerization of alkylene oxides such as ethylene oxide, propylene oxide, 1,2- or 2,3-butylene oxide, styrene oxide, epichlorohydrin or tetrahydrofuran, particularly those polyalkylene glycol ethers which have a hydroxyl group content of about 0.5 to 25 percent may also be used. Copolymers may also be used. In addition there may be mentioned linear or branched addition products obtained by the addition of the said alkylene oxides for example to polyfunctional alcohols, aminoalcohols or amines. The polyfunctional components for the addition of the alkylene oxides may be, for example, ethylene glycol, 1,2-propylene glycol, trimethylolpropane, butanetriol-(1:2:4), glycerol, castor oil, ethanolamine, diethanolamine, triethanolamine, aniline and alkylene diamines of the type ethylene diamine, tetra- or hexamethylene diamine. Mixtures of linear or branched polyalkylene glycol ethers of various types may be employed. Also, brominated mono- and polyhydric alcohols such as 2,2-bis(bromomethyl)-1,3-propanediol, 3-bromo-2,2-bis(bromomethyl)propanol and others disclosed in U.S. Pat. No. 3,542,740 may be used.

In the preparation of compositions in accordance with the present invention, the trichloroethylene copolymer is most advantageously dissolved in the polyisocyanate and the resultant composition is then combined with the active hydrogen compound to provide the desired polyurethane. Alternatively, the trichloroethylene copolymer can be suitably combined with the active hydrogen compound which is subsequently reacted with the polyisocyanate. The trichloroethylene copolymer is used in amounts sufficient to improve the flame retardance of the resultant polyurethane, preferably in amounts sufficient to render the resultant polyurethane self-extinguishing by the standards set forth in Underwriters Lab Standard Test No. 94. Generally, such amounts of copolymer are within the range from about 1 to about 50 weight percent based on the polyurethane, preferably from about 5 to about 33.3 weight percent. It is understood that within the foregoing range the particular polyurethane and the amount of trichloroethylene in the copolymer will determine the specific amount of copolymer needed to render the polyurethane flame retardant.

In the preparation of polyurethane coatings having the improved flame retardant characteristic, it is generally desirable to use a flow control agent in the composition, preferably material such as cellulose acetate butyrate. These compounds produce a smooth flowing coating composition capable of providing a uniform thickness and consistency. In addition, various antioxidants and stabilizers may also be incorporated into the composition. It is desirable according to the present invention, to use as an antioxidant, 2,6-di-t-butyl-4-methylphenol. Suitable solvents beneficially employed in making the polyurethane in the form of a coating are the aromatic hydrocarbons such as benzene, xylene and toluene and mineral spirits and the like.

In the preparation of polyurethane foam plastics having improved flame retardance, the trichloroethylene copolymer is dispersed in one or other of the reactants, preferably the polyisocyanate, and the polyurethane is formed and then foamed using conventional techniques.

As an exemplary technique for preparing polyurethane foam plastic which is suitable for the practice of the present invention, the foregoing components are rapidly and thoroughly mixed together in the presence of water and/or blowing agents, e.g., volatile organic compounds such as halogenated alkanes or compounds which decompose to split off nitrogen, for example, azodiisobutyronitrile. The polyurethane foam may be produced in two stages, a prepolymer first being formed from the active hydrogen component and the polyisocyanate, this prepolymer being then foamed in the conventional manner in the second stage.

For the formation of polyurethane in accordance with the present invention, catalysts usually used such as dimethylbenzylamine, N-methyl-N'-(N-dimethylaminoethyl)-piperazine, triethylene diamine, permethylated diethylene triamine and organic tin compounds, for example, dibutyl tin dilaurate or tin (II) octoate. In addition, stabilizers such as sulfonated castor oils and their sodium salts and dyestuffs as well as other additives such as antimony oxide, elemental red phosphorus, boron trioxide, or metal fillers may also be added.

The following examples are given to illustrate the concept of the present invention and should not be construed as limiting the scope thereof. In the following examples, all weights and percentages are by weight unless otherwise indicated.

EXAMPLE 1

A 100-part portion of a copolymer of 60.5 mole percent of trichloroethylene and 39.5 mole percent of vinyl acetate having an average molecular weight of 720 as determined by boiling point elevation is blended at room temperature with 100 parts of toluene diisocyanate (an 80/21 percent mixture of the 2,4- and 2,6-isomers) until a homogeneous liquid solution results (2-3 minutes). The copolymer solution is then combined with 100 parts of tris(hydroxypropyl)ether of glycerine and 1 part of stannous octoate catalyst. The resultant combination is poured into a stainless steel mold, preheated in an oven to 60°C. The reaction mixture polymerizes spontaneously to a solid sample (6 × 7 × ¼ inches) of polyurethane elastoplastic (cross-linked resin) in less than 1 minute. The molded sample is removed, cut into ½ inch wide × 5 inches long bars and tested for flame retardance by the following procedure (ASTM D-1692-68):

A flame is applied to one end of the bar at an angle of 90° for a period of 60 seconds. The flame is removed and the time from the first application of the flame until the flame burns 12.7 cm of sample or is extinguished before burning 12.7 cm of sample is recorded.

The foregoing sample when tested by this method self-extinguishes within 77 seconds (17 seconds after removal of flame) with 1.9 cm of sample being burned.

For the purposes of comparison, a control sample is similarly prepared from the toluene diisocyanate and tris(hydroxypropyl)ether of glycerine without the copolymer additive and tested by the foregoing method for flame retardancy. The entire 12.7 cms of the control sample burned.

EXAMPLE 2

Following the procedure of Example 1, polyurethane compositions are prepared using a copolymer of 47.5 mole percent trichloroethylene and 52.5 mole percent of vinyl acetate and having an average molecular weight of 1310. The resultant polymer is tested for flame retardancy by the method disclosed in Example 1 and is observed to self-extinguish within 81 seconds with 2.2 cm of the sample being burned.

EXAMPLE 3

A 200-part portion of the copolymer described in Example 1 is blended at room temperature with 100 parts of toluene diisocyanate as described in Example 1 until a homogenous liquid solution results (2-3 minutes). The copolymer solution is then combined with 100 parts of tris(hydroxypropyl)ether of glycerine and 1.2 part of stannous octoate catalyst. The resulting combination is then polymerized and tested for flame retardancy in the manner described in Example 1. This sample self-extinguishes within 74 seconds with 2.2 cm of the sample being burned.

EXAMPLE 4

A 10-part portion of the copolymer described in Example 1 is blended at room temperature with 100 parts of toluene diisocyanate as described in Example 1 until a homogenous liquid solution results. The copolymer solution is then combined with 100 parts of tris(hydroxypropyl)ether of glycerine and 1 part of stannous octoate catalyst, polymerized and tested for fire retardancy following the procedures of Example 1. This sample self-extinguishes within 344 seconds with 5.2 cm of the sample being burned.

Following the same procedure except using 20 parts of the copolymer described in Example 1, a sample was prepared and tested for fire retardancy. The sample self-extinguishes within 105 seconds with 1.6 cm of the sample being burned.

EXAMPLE 5

A 100-part portion of the copolymer described in Example 1 is blended at room temperature with 100 parts of toluene diisocyanate as described in Example 1 and 100 parts of tris(hydroxypropyl)ether of glycerine until a homogenous liquid solution results. The resulting solution is then combined with 2.5 parts of lead (II) octoate catalyst. The resultant combination is then polymerized in accordance with the procedure of Example 1 and tested for fire retardancy. The resultant sample when tested by the method described in Example 1 self-extinguishes within 77 seconds with 2.1 cm being burned.

EXAMPLE 6

An isocyanate terminated polyurethane prepolymer containing free toluene diisocyanate is prepared by reacting 82 parts of toluene diisocyanate as described in Example 1 with 18 parts of tris(hydroxypropyl)ether of glycerine at about 60°C. A 100-part portion of the copolymer described in Example 1 is blended at room temperature with 100 parts of the prepolymer until a homogenous liquid solution results (1 to 3 minutes). The resultant solution is then combined with 100 parts of tris(hydroxypropyl)ether of glycerine and 1 part of stannous octoate catalyst. The resulting combination is then polymerized and tested for flame retardancy following the procedure of Example 1. The resultant sample self-extinguishes within 69 seconds with 2.7 cm of the sample being burned.

EXAMPLE 7

A 100-part portion of a copolymer of 47.5 mole percent trichloroethylene and 52.5 mole percent of vinyl acetate having a molecular weight of 1270 is blended with toluene diisocyanate and tris(hydroxypropyl)ether of glycerine and stannous octoate in the manner disclosed in Example 1. The resulting composition is polymerized and tested for fire retardancy in accordance with Example 1. This sample self-extinguishes within 104 seconds with 2.5 cm of the sample being burned.

What is claimed is:

1. A polyurethane plastic containing a flame retarding amount of a copolymer said amount being in the range from about 1 to about 50 weight percent based on the weight of the polyurethane, and said copolymer consisting essentially of from about 33.3 to about 66.7 mole percent of trichloroethylene and from about 33.3 to about 66.7 mole percent of vinyl acetate wherein from 0 to about 100 mole percent of the copolymerized vinyl acetate is hydrolyzed to vinyl alcohol or is hydrolyzed and then re-esterified with a carboxylic acid, said copolymer having a molecular weight in the range from about 300 to about 20,000.

2. The polyurethane plastic of claim 1 comprising a polyurethane containing from about 1 to about 50 weight percent based on the polyurethane of a copolymer of from about 50 to about 66.7 mole percent of trichloroethylene and from about 33.3 to about 50 mole percent of vinyl acetate, said copolymer having a molecular weight in the range from about 300 to about 6,000.

3. The polyurethane plastic of claim 2 comprising a polyurethane which is the reaction product of a polyisocyanate and an alcohol containing from about 5 to about 33.3 weight percent based on the polyurethane of a copolymer of from about 57 to about 66.7 mole percent of trichloroethylene and from about 33.3 to about 43 mole percent of vinyl acetate, said copolymer having a molecular weight in the range from about 300 to about 2,500.

* * * * *